Figure 1:
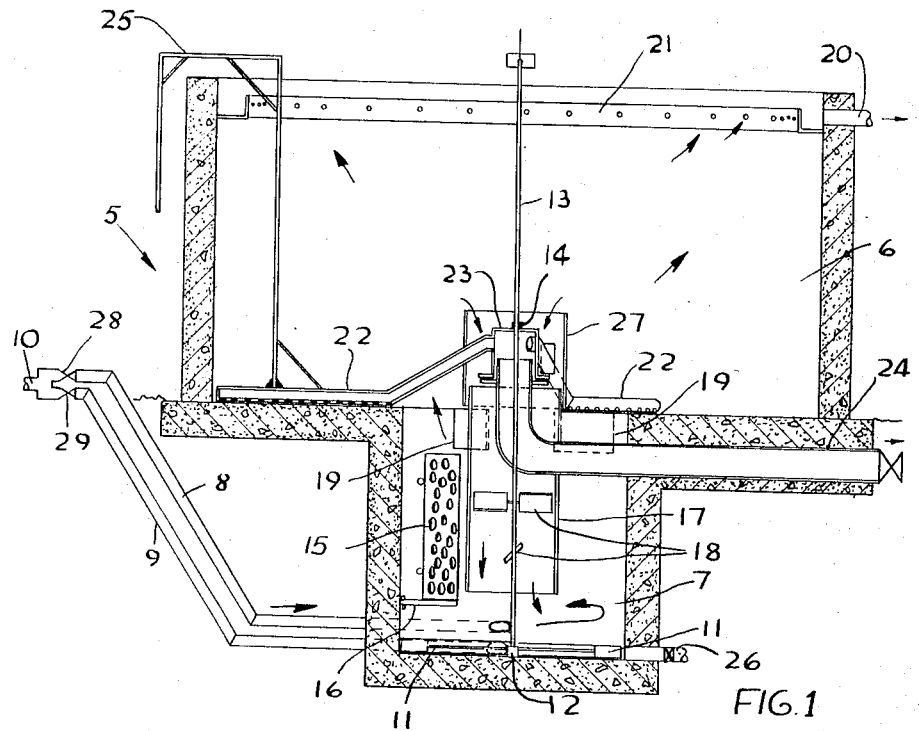

Feb. 21, 1967 D. R. SCHLEISS 3,305,096
SEDIMENTATION APPARATUS
Filed Feb. 1, 1965

David Raymond Schleiss,
Inventor
By Wenderoth, Lind & Ponack, Attys.

United States Patent Office 3,305,096
Patented Feb. 21, 1967

3,305,096
SEDIMENTATION APPARATUS
David Raymond Schleiss, Durban, Natal, Republic of South Africa, assignor to Davco (Proprietary) Limited, Durban, Natal, Republic of South Africa
Filed Feb. 1, 1965, Ser. No. 429,358
Claims priority, application Republic of South Africa, Feb. 12, 1964, 64/0,639
7 Claims. (Cl. 210—195)

This invention relates to improvements in sedimentation apparatus siutable for use in the purification of water and other liquids.

One of the most normal preliminary steps in water purification is coagulation and flocculation, in which floc particles obtained by chemical treatment are made to collide, adhere and grow into larger, distinct particles, absorbing and trapping dispersed suspended matter in the water.

Normally, immediately after addition of flocculants, a flash mix of short duration is applied, in order to effect dispersion of the chemicals; thereafter slower movement of the water for a period of between five and twenty-five minutes causes precipitation followed by particle collision. Ideal movement consists of a degree sufficient for adherence of particles that collide but insufficient to cause particle separation.

These particles then settle relatively easily under quiescent or near quiescent conditions, thus separating suspended matter from the water.

Mixing of previously formed floc with fresh, growing floc is considered to be an advantage. Mechanically operated paddles and/or pumps are often used for this purpose. In addition, water may be introduced into or near the apex of an inverted cone settling tank so that it meets settling floc on its path up the basin, the object being to create a blanket of floc through which the water must pass before reaching the settling zone.

The present invention is one in which these conditions are achieved in a simple, and economical manner, irrespective of flow rate variations above and below the rated capacity of the basin. Automatic floc re-circulation is obtained and, once a floc has been formed in the liquid, the formation of a floc blanket is automatic and foolproof.

According to the invention, sedimentation, apparatus for the purification of a liquid such as water to which coagulants have been added, comprises a basin which is constituted by an upper main settling compartment and a lower mixing and coagulating compartment of substantially smaller cross-sectional area than the main settling compartment and constituting a well portion thereof, at least one tangential raw water inlet at the bottom of the mixing and coagulating compartment, a bladed water wheel at the bottom of the mixing and coagulating compartment mounted for rotation about a vertical axis on an upwardly extending shaft and arranged to be driven by the tangential incoming flow of water from a raw water inlet, which also imparts swirling motion to the water, baffles in the mixing and coagulating compartment above the water wheel adapted to create eddy currents and gradually to slow down the swirling motion of the water, a hollow open-ended floc-return cylinder extending downwardly into the mixing and coagulating compartment and surrounding the upwardly extending part of the shaft of the water wheel, one or more propeller blades mounted on such upwardly extending and surrounded part of the water wheel shaft, said blades arranged to cause a downward return of water within the floc-return cylinder from the lower region of the settling compartment to the bottom of the mixing and coagulating compartment, clarified water outlet means disposed at or around the top of the wall of the main settling compartment, and means for removing settled sludge from the bottom of the settling compartment and the bottom of the mixing and coagulating compartment.

Preferably two tangential raw water inlets are provided, one of which is on the same horizontal plane as the bladed water wheel for driving it, and the other is on a plane above the water wheel to impart additional swirling motion to the water in the mixing and coagulating compartment, and wherein both are controlled by adjustable shut-off valves.

Preferably also one lower set of baffles arranged at adjustable angles to the sides of the mixing and coagulating compartment is provided above the water wheel, and an upper set of fixed baffles is situated above these adjustable baffles at the top of the mixing and coagulating compartment, which fixed baffles extend from the sides of the compartment to the floc-return cylinder and act as means for substantially stopping the swirling motion of the water imparted to it by the inflowing raw water.

Preferably, both the settling compartment and the mixing and coagulating compartment are of circular sectioned cylindrical form and are arranged concentrically with respect to one another. The floc-return cylinder is likewise preferably of circular cross-section and is located concentrically within the mixing and coagulating compartment so that its bottom open end terminates above the water wheel, while its top open end terminates above the level of the bottom of the settling compartment, and wherein its external diameter is substantially less than the internal diameter of the mixing and coagulation compartment. It is however, preferably arranged for limited vertical adjustment.

The coagulants are preferably added at or near the tangential water inlet so that the initial vigorous swirling motion which is created adjacent to the bottom of the coagulating chamber, results in immediate dispersion into the incoming water due to the "flash mix." Progressive closing of the valve situated on the inlet line which is in the same horizontal plane as the water wheel blades, whilst the other inlet valve is progressively opened, reduces the speed of the water wheel and consequently the rate of recirculation of floc and vice versa.

The initial swirling-motion of the water continues with decreasing momentum as the water progresses up the coagulating chamber, due to the action of the baffles in creating eddy currents and reducing the swirling motion, thus creating good conditions for coagulation.

The size of the coagulating chamber is calculated to yield an optimum coagulation period. By the time the water reaches the lower region of the settling chamber, both sets of baffles have substantially stopped the swirling motion so that near quiescent conditions obtain in this region.

As the water passes out of the top end of the coagulating chamber, it is arranged to have virtually no swirling motion and its upward velocity is such that it is above the average settling rate of the floc particles. However, this velocity diminishes rapidly as the water moves upwardly and outwardly towards the top water outlet means, at which stage the velocity is well below the rate at which the floc tends to settle. Hence, an intermediate zone is provided where the velocity is equivalent to the settling rate of floc, whereby the floc is kept in suspension and thereby the floc blanket is maintained.

The apparatus is designed so that, during normal operation, the floc blanket or zone extends preferably up to a level approximately half-way between the top end of the coagulation chamber and the top clarified water outlet. However, the floc blanket will also form at flow rates of the incoming water either above or below that for which the apparatus was originally designed. The apparatus has, therefore, an exceptionally high degree of flexibility in operation, and this is obtained automatically without having to make adjustments to compartments or flow rates within the sedimentation basin itself.

The top open end of the floc-return cylinder is arranged to be located in and draw floc-bearing water from the dense part of this floc-blanket zone, so that during operation a flow of this floc-bearing water is caused, due to the action of the propellers on the water wheel shaft, to flow downwardly, and mix with the water in the mixing and coagulating zone. This floc recirculation aids coagulation and helps to seed the incoming water.

The body of water immediately above the annular shelf previously referred to where the floc settles, is almost quiescent, hence floc which has settled on the shelf remains undisturbed, and therefore tends to form a compact sludge having a relatively high solids/water ratio.

Means for removing the sludge layer may comprise one or more perforated radially disposed pipes mounted for rotation close to the surface of the shelf, and connected to a central sludge discharge pipe extending to the outside of the settling compartment. Rotation of the perforated pipe or pipes may be effected manually or by power means.

For removing sludge which collects in the mixing and coagulating chamber, a sludge draw-off pipe is connected to the bottom thereof.

The baffles in the mixing and coagulating chamber are preferably perforated plates mounted on the vertical walls thereof and extending inwardly. They may be mounted so that their angular dispositions may be adjusted to vary their baffling effect.

The clarified water outlet may be an annular weir or an annular perforated pipe.

Figure 2:
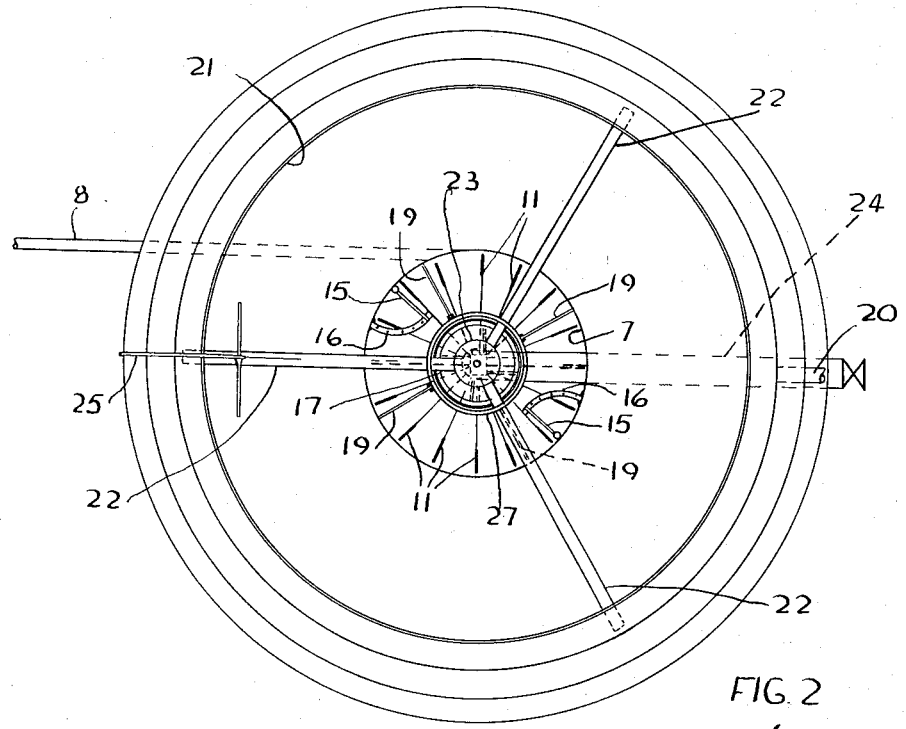

To enable the invention to be more clearly understood and carried into practice, reference is now made to the accompanying drawings in which:

FIGURE 1 is a vertical cross-sectional view of sedimentation apparatus constructed according to the invention, and FIGURE 2 is a plan view taken on FIGURE 1.

Referring to the drawings, reference 5 denotes the basin generally which is constituted by an upper circular cylindrical main settling compartment 6 and a lower similarly shaped mixing and coagulating compartment 7 of substantially smaller cross-sectional area than the main compartment 6 and forms a well portion thereof. Raw water for treatment under pressure is introduced at the bottom end of the compartment 7 by two water inlet pipes 8 and 9 connected to a raw water main 10, and entering the compartment 7 tangentially at different heights from the bottom thereof. The raw water entering via the lower water inlet pipe 9 is arranged to impinge on the radial blades 11 of a water wheel 12 mounted on and keyed to a vertical shaft 13 extending upwardly through the basin 5 and rotatably supported at its top end by a bearing 14. Its bottom end is supported in a suitable bottom end bearing. The tangential entry of raw water from the inlet pipe 9, besides driving the water wheel 12, also imparts a swirling motion to the water in the compartment 7. By closing valve 28 and opening valve 29, the speed of rotation of the water wheel is increased to a maximum and, vice versa, the speed is reduced to a minimum. Hence the speed of rotation of the water wheel and the propellers attached to the same axle can be readily varied or adjusted. In this way, the amount of floc-bearing water that is recirculated from the settling compartment 6 to the mixing and coagulating compartment 7 can be adjusted.

Located in the compartment 7 and pivotally connected to the side walls thereof are two diametrically opposite perforated baffles 15 which are each adjustably fixable in different angular positions by means of arcuate fixing plates 16 provided with a series of holes to receive stop pins.

Also located in the compartment 7 and extending upwardly part way into the compartment 6, is the open-ended tubular floc-return cylinder 17 which surrounds and is arranged concentrically with respect to the lower region of the shaft 13. Operating inside this floc-return cylinder 17 and fixed to the shaft 13, are two pairs of radial propeller blades 18, set to cause downward return flow of water within the floc-return cylinder 17, when the water wheel 12 is rotated by the raw water entering via the outer inlet pipe 9. Fixed to and extending radially outwardly from the upper end of the floc-return cylinder 17 are four circumferentially spaced fixed imperforate baffle plates 19, which are arranged substantially to stop the swirling motion of the water as it enters the lower region of the compartment 6 constituting the floc blanket zone previously referred to.

The clarified water is arranged to be drawn off by way of the outlet pipe 20 after it has passed through the perforated inner wall of a circular channel 21 disposed around the top end of the compartment 6. The sludge which settles on the annular bottom of the main settling compartment 6, is arranged to be periodically removed by the three perforated radially disposed sludge removal pipes 22 which radiate spoke-fashion from a hollow dome-shaped boss 23 which fits over and is rotatably supported as shown, on the upturned end of a sludge suction discharge pipe 24 leading to the outside of the sedimentation basin 5. The perforated sludge removal pipes 22 are arranged to be rotated by a handle frame 25 attached to one of them. The compartment 7 may be drained by the drain outlet pipe 26 at its bottom end. A top tubular extension piece 27 which overlaps the top end of the floc-return cylinder 17, is arranged to rotate with the radial pipes 22 and provides the top inlet opening for the water current flowing down the floc-return cylinder 17 as shown by the arrows, which is generated by rotation of the propeller blades 18, in a clockwise direction as regards FIGURE 2. The two raw water inlet pipes 8 and 9 are provided with adjustable shut-off valves 28 and 29 to control the rate of inflow through each of such pipes independently.

The advantages that we now claim for the new invention are:

(i) Although the incoming water or liquid to be treated is brought into the treatment tank at its lowest point, the flow does not interfere wih or disturb the quiescence of the sludge-compacting zone.

(ii) Settling takes place as a result of flow of liquid from the very bottom of the main tank and from the centre, hence the volume of the tank is made full use of.

(iv) Whilst floc recirculation could be effected by a motor-operated propeller, automatic and easily regulated re-circulation is preferred by using the water wheel system.

(v) By having baffles situated in the vertical plane with adjustable angles to the sides of the mixing coagulating compartment, a variable set of stirring conditions can be attained in the coagulating zone thus meeting the contingencies of a wide range of different conditions of turbidity or colour or type(s) of coagulant(s).

I claim:

1. Sedimentation apparatus for the purification of a liquid such as water to which coagulants have been added which comprises, a basin which is constituted by an upper main settling compartment and a lower mixing and coagulating compartment of substantially smaller cross-sectional area than the main settling compartment, and constituting a well portion thereof, at least one tangential raw water inlet at the bottom of the mixing and coagulating compartment, a bladed water wheel at the bottom of the mixing and coagulating compartment mounted for rotation about a vertical axis on an upwardly extending shaft and arranged to be driven by the tangential incoming flow of water from a raw water inlet, which also imparts swirling motion to the water, baffles in the mixing and coagulating compartment above the water wheel adapted to create eddy currents and gradually to slow down the swirling motion of the water, a hollow open-ended floc-return cylinder extending downwardly into the mixing and coagulating compartment and surrounding the upwardly extending part of the shaft of the water wheel, one or more propeller blades mounted on such upwardly extending and surrounded part of the water wheel shaft, said blades arranged to cause a downward return flow of water within the floc-return cylinder from the lower region of the settling compartment to the bottom of the mixing and coagulating compartment, clarified water outlet means disposed at or around the top of the wall of the main settling compartment, and means for removing settled sludge from the bottom of the settling compartment and the bottom of the mixing and coagulating compartment.

2. Sedimenttaion apparatus as claimed in claim 1, wherein two tangential raw water inlets are provided, one of which is on the same horizontal plane as the bladed water wheel for driving it, and the other is on a plane above the water wheel to impart additional swirling motion to the water in the mixing and coagulating compartment, and wherein both are controlled by adjustable shut-off valves.

3. Sedimentation apparatus as claimed in claim 1, wherein one lower set of baffles arranged at adjustable angles to the sides of the mixing and coagulating compartment is provided above the water wheel, and wherein an upper set of fixed baffles is situated above these adjustable baffles at the top of the mixing and coagulating compartment, which fixed baffles extend from the sides of the compartment of the floc-return cylinder and act as means for substantially stopping the swirling motion of the water imparted to it by the inflowing raw water.

4. Sedimentation apparatus as claimed in claim 1, wherein both the settling compartment and the mixing and coagulating compartment are of circular sectioned cylindrical form and are arranged concentrically with respect to one another.

5. Sedimentation apparatus as claimed in claim 4, wherein the floc-return cylinder is of circular cross-section and is located concentrically within the mixing and coagulating compartment so that its bottom open end terminates above the water wheel, while its top open end terminates above the level of the bottom of the settling compartment, and wherein its external diameter is substantially less than the internal diameter of the mixing and coagulating compartment.

6. Sedimentation apparatus as claimed in claim 1, wherein the means for removing settled sludge from the bottom of the settling compartment, comprises a plurality of perforated radially disposed pipes which radiate spoke-fashion from a hollow dome-shaped boss which fits over and is rotatably supported on the upturned end of a suction sludge discharge pipe leading to the outside of the sedimentation basin, and wherein means are provided for rotating the perforated pipes close to the bottom of the settling compartment.

7. Sedimentation apparatus as claimed in claim 6, wherein a top tubular extension piece overlaps the top end of the floc-return cylinder and is arranged to rotate with the radial perforated sludge removing pipes, and wherein the top open end of such extension piece provides the top inlet opening for the water current flowing down the floc-return cylinder, which is generated by rotation of the propeller blades.

No references cited.

REUBEN FRIEDMAN, *Primary Examiner.*

W. S. BRADBURY, *Assistant Examiner.*